April 26, 1960  W. T. TOUTANT  2,933,897
ROTARY HYDRAULIC BOOSTER
Filed May 21, 1957  2 Sheets-Sheet 1

INVENTOR.
WILLIAM T. TOUTANT.
BY
Christy, Parmelee & Strickland
ATTORNEYS.

April 26, 1960

W. T. TOUTANT 2,933,897

ROTARY HYDRAULIC BOOSTER

Filed May 21, 1957

INVENTOR.
WILLIAM T. TOUTANT.
BY
Christy, Parmelee & Strickland
ATTORNEYS.

United States Patent Office 2,933,897
Patented Apr. 26, 1960

2,933,897

ROTARY HYDRAULIC BOOSTER

William T. Toutant, Pittsburgh, Pa., assignor to Dravo Corporation, Pittsburgh, Pa., a corporation of Pennsylvania Application May 21, 1957, Serial No. 660,601

4 Claims. (Cl. 60—53)

This invention relates to rotary hydraulic boosters and more particularly to a hydraulic power transmission system, in a part of which either the flow rate of fluid under pressure or the pressure of fluid transmitted may be varied by increasing one while decreasing the other.

Heretofore, in most hydraulic power transmission systems a fluid pressure hydraulically operated fluid pressure motor herein called the driven motor has had to produce high speed operations at some times and high torque operations at other times. Since these peaks are not usually required simultaneously, the motor for driving the system, such as an electric motor has had to be able to produce whichever might be required, with the other representing wasted potential. By the use of a rotary hydraulic booster in the manner hereinafter described in connection with the invention, the use of a smaller electric or other motor for driving the system than that previously required may now be possible.

There are in present use some reciprocating hydraulic boosters for increasing delivery pressure of fluid while decreasing the rate of flow of delivery fluid, but their valving is such that the same units can not be used for the opposite or converse purpose. Also since they are of the reciprocating type, the output is a pulsating flow resulting in hammer noises arising from excessively high impact pressures. The rotary hydraulic booster as incorporated in a power transmission system arranged according to the invention herein described may be used in any place where a pressure converter may be used and has a wide variety of applications, including, but not limited to, capstans, winches, hoisting engines, ship steering systems, boom luffing and the like.

A principal object of this invention therefore is to provide a hydraulic system including a power-driven pump and fluid pressure driven motor with a booster which will operate to either increase or decrease the pressure of the fluid output to the driven motor while at the same time oppositely changing the magnitude of the flow rate to the driven motor.

Another object is to provide a variable hydraulic power transmission system which, because of the steady flow with steady pressures, has no hammer noise and is free of undesirable pulsations.

Another object is to provide a variable hydraulic power transmission system in which a rotary hydraulic booster is interposed between a hydraulic pump operated by a driving motor such as an electric motor, and a hydraulic driven motor, which booster will act as a pressure converter so that the driving motor and the pump which it drives will always operate at substantially their optimum conditions, regardless of the load being driven.

Other objects and advantages will appear from the following more detailed description of the invention when taken in connection with the accompanying drawings, wherein.

Figure 1:
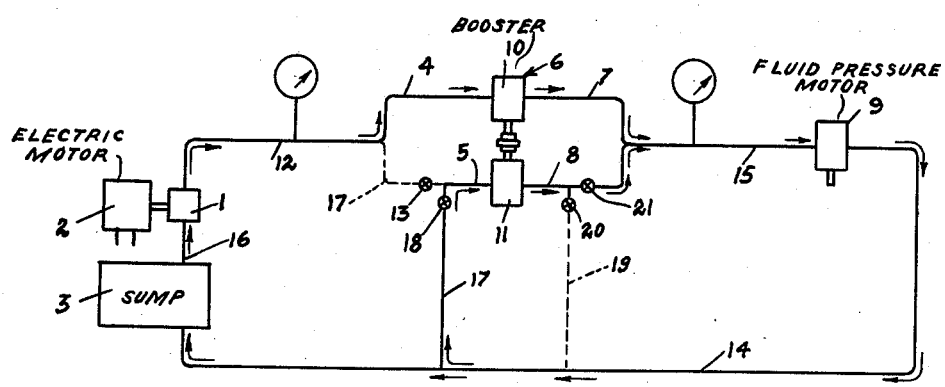
Fig. 1 is a schematic diagram of a novel hydraulic power transmission system which includes a novel rotary hydraulic booster shown in outline, with connections established for obtaining high speed operation of a rotary hydraulic motor.
Figure 2:
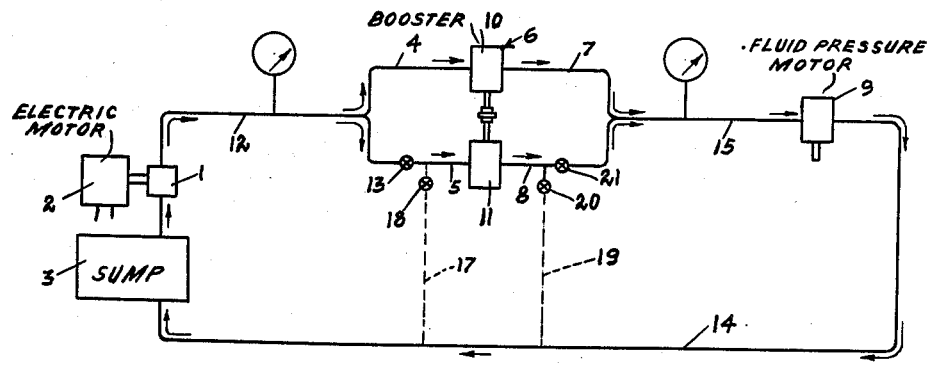
Fig. 2 is a schematic diagram of the same hydraulic system as shown in Fig. 1 with connections established for obtaining medium speed operation of the rotary hydraulic motor.
Figure 3:
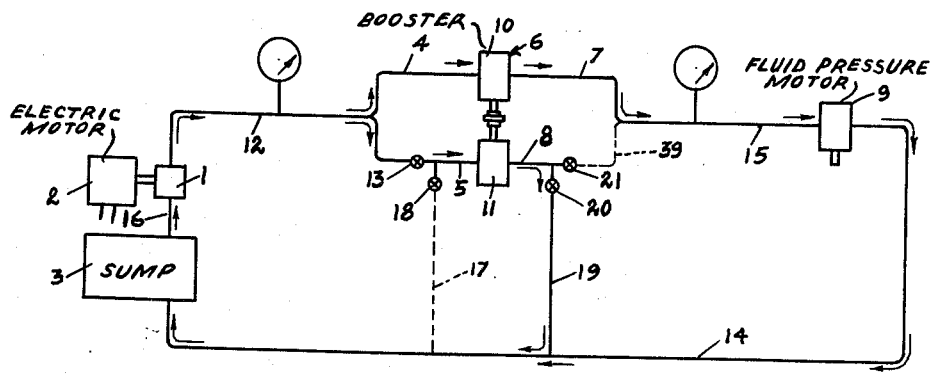
Fig. 3 is a schematic diagram of the same hydraulic system as shown in Fig. 1 with connections established for obtaining low speed operation and increased torque of the rotary hydraulic motor.

The novel and improved hydraulic system shown in Figs. 1, 2 and 3 comprises a rotary hydraulic pump 1 operated by a driving motor 2, here indicated as an electric motor, to draw liquid from a sump 3 and selectively supply hydraulic pressure to one or both, as the case may be, of two branch pipes, 4, 5 leading to a rotary hydraulic booster or pressure converter 6, which may in turn supply hydraulic pressure to one or both of two outlet pipes 7, 8 leading to a driven rotary hydraulic motor 9, which may be used to drive a mechanism such for example as a capstan, winch, hoist or other mechanism, not shown.

The rotary hydraulic booster 6 may comprise two preferably similar rotary hydraulic motors, these being constant displacement multiple piston hydraulic motors. Devices of this type capable of operating either as a motor or a pump are widely used in hydraulic systems and per se form no part of the present invention. In their simplest form they comprise a rotor with radially-movable vanes eccentrically positioned in a cylindrical chamber, while more elaborate devices include a crank shaft with a radial system of pistons and cylinders thereabout. Typically I may use two Vickers MF-38-2 type of motors in the booster unit. Such motors are of the constant displacement multiple piston rotary type having a number of cylinders extending axially of the crank shaft with pistons that cooperate with a wobble plate on the shaft, and which exerts a thrust on the pistons or against which the pistons exert a thrust, depending on whether the device is operating as a pump or a motor.

Referring now to Fig. 1 in detail, the outlet of the pump 1 is connected through pipe 12 to both pipes 4 and 5, but, as indicated by the dotted lines, valve 13 is closed, so that the entire output of pump 1 is delivered to unit 10 of the booster. From unit 10 fluid flows through pipe 7 and pipe 15 to the driven motor 9. From driven motor 9 there is a pipe 14 leading back to the sump 3. The connection between the sump and pump 1 is designated 16. There is a pipe 17 having a valve 18 therein connecting pipe 14 with pipe 5 between valve 13 and the other unit, 11 of the booster. This is shown in full lines, indicating that valve 18 is open. There is a second pipe 19 with a valve 20 therein connecting pipe 14 and pipe 8 leading from the outlet of the booster unit 11 to pipe 15. The broken lines in Fig. 1 indicate valve 20 to be closed. There is a valve 21 in pipe 8 beyond the point where pipe 19 joins to pipe 8, and in Fig. 1 this valve is open. Valves 13, 18, 20 and 21 are all selectively operable, being here illustrated as simple hand valves.

In the operation of the system as shown in Fig. 1, all of the output of pump 1 is directed through booster unit 10 which runs as a motor, driving unit 11 which operates as a pump to draw liquid at low or atmospheric pressure from line 14 and direct it through pipe 8. The outflow from pipe 8 joins the outflow from pipe 7, resulting in a large volume of fluid flowing through pipe 15 to the driven motor 9. The driven motor 9 is thus supplied with a maximum volume of fluid to drive it at high speed, but with relatively low pressure.

In Fig. 2, valve 13 is open, valve 18 is closed, valve 20 is closed, and valve 21 is open. In this system the booster does not vary the pressure or flow from the pump 1, since the output of pump 1 passes equally through both booster units to the driven motor 9, and the booster merely idles on the line. This is a normal condition where the driven motor 9 is to operate at a medium speed and develop a medium torque.

In Fig. 3, valve 13 is open, valve 18 is closed, valve 20 is open, and valve 21 is closed. Part of the output of pump 1 then flows through the unit 11 to the low pressure side of the system, driving unit 11 as a motor. The unit 11 drives unit 10, so that a part of the output of pump 1 now passes through unit 10 which is deriving power from the unit 11 and is therefore operating as a pump to increase the pressure of the fluid flowing through pipes 7 and 15 to the driven motor 9. This produces the maximum pressure or torque, but since a large volume of liquid is directed through unit 11 to the low pressure side of the system, the speed is decreased.

Thus the booster system allows electric motor 2 and pump 1 to operate at a fixed speed and the driven motor 9 can be operated at a variety of speeds depending on the volume of fluid supplied to it, the speed decreasing as the torque increases, and vice versa.

The system shown in Figs. 4 to 8 inclusive employs substantially the same apparatus as that shown in Figs. 1, 2 and 3 with the chief exception that the booster designated generally by the numeral 26, has three similar hydraulic units 27, 28 and 29 coupled together on the same shaft instead of two, each unit being interchangeably operable as a pump or a motor. In my experimental work I have satisfactorily used a commercial unit embodying three such elements known as the M–15–B3 Berry Motor.

Figure 4:
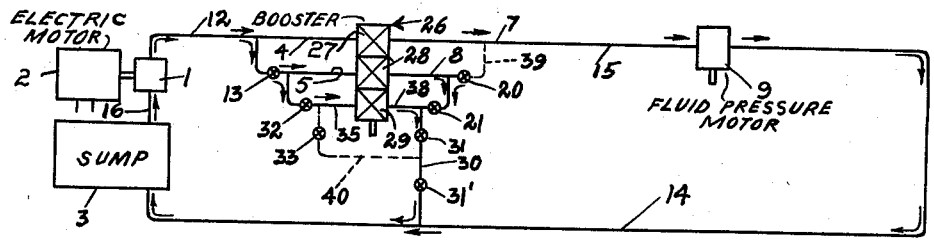
Fig. 4 is a schematic diagram of a modification of the hydraulic system shown in Figs. 1, 2 and 3 incorporating a different type of booster with connections established for obtaining low speed operation of the same rotary hydraulic motor.

The hydraulic circuit shown in Fig. 4 corresponds to that shown in Fig. 3, being adapted to provide low speed and high torque operation of the driven motor 9. Like pump unit 10 in Fig. 3, the inlet side of unit 27 acting as a pump is connected to the supply pump 1 by conduit 12 and inlet pipe 4, and to the driven motor 9 by way of outlet pipe 7 and delivery conduit 15. Like motor unit 11 of Fig. 3, the motor unit 28 is connected so that fluid is supplied under pressure from inlet pipe 5 and exhausted at atmospheric pressure to sump 3 by way of outlet pipe 8 which is connected to discharge conduit 14 by way of the presently open valves 21, pipe 30, valves 31 and 31', and which is cut off from delivery pipe 15 by valve 20, as indicated by the broken line 39, in the same manner as motor unit 11 is in Fig. 3. Motor unit 29 is connected in parallel with motor unit 28, having supply pipe 12 connected to its inlet side by way of presently open valves 13 and 32, and inlet pipe 35 and its outlet connected to sump 3 at atmospheric pressure by way of outlet pipe 38, pipe 30, open valves 31 and 31', and discharge conduit 14.

In operation, both booster units 28 and 29 of the booster assembly 26 will operate at their maximum power since the pressure drop across the motor units will be at its greatest, that is from supply pressure of fluid in supply pipe 12 to atmospheric pressure in sump 3. The energy thus expended in passing through the motor units will operate unit 27 as a pump to increase the fluid pressure of the oil which it receives from pump 1 and delivers to outlet pipe 7, conduit 15, and driven motor 9. The system includes a pipe 40 in which is a valve 33 that connects pipe 35 with pipe 30 between valve 31 and 31', and in Fig. 4 valve 33 is closed, as indicated by pipe 40 being shown in broken lines. The volume of fluid delivered to the driven motor 9 will be at a minimum and the pressure of the same will be at a maximum relative to the volume and pressure of fluid in supply pipe 12. As a result the driven motor 9 will operate at a minimum speed with maximum torque relative to the normal operation.

Figure 5:
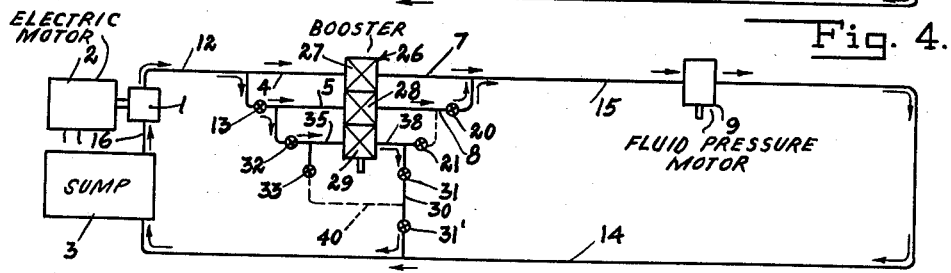
Fig. 5 is a schematic diagram of the same hydraulic system as shown in Fig. 4 with connections established for obtaining an operating speed, intermediate low speed and medium speed.

In Fig. 5 the hydraulic circuit is established for the purpose of operating the driven motor 9 at a speed faster than that provided by the circuit as shown in Fig. 4, and slower than the normal or medium speed that would be provided by a direct connection between pump 1 and driven motor 9. The torque output of the driven motor will of course be reduced from that provided in Fig. 4. This hydraulic circuit differs from that shown in Fig. 4 in that valve 20 is now open, thereby connecting the outlet pipe 8 of booster unit 28 in parallel with unit 27 to delivery pipe 15. However, valve 21 which is open in Fig. 4 is now closed, so that motor unit 29 is still connected to sump 3 by way of pipe 30, valves 31 and 31' and discharge conduit 14. Thus, the outlets of the two motor units are divided, one going to the driven motor while the other goes to the sump. Booster unit 29 therefore delivers energy to 27 and 28 to boost the output pressure from pump 1, but a greater volume of fluid is delivered to driven motor 9 than in Fig. 4, but at lower pressure.

Therefore, in the operation of the hydraulic circuit shown in Fig. 5 the motor unit 28 will not take part in driving the pump unit 27, but will add to the volume of fluid supplied to the delivery pipe 15, thereby increasing the speed and reducing the torque over that of the circuit shown in Fig. 4. The motor unit 29 will act to drive the units 27 and 28 as pumps since its energy is derived from the fluid pressure drop from the pressure of fluid in supply conduit 12 to atmospheric pressure in sump 3. There is provided thereby an intermediate stage of speed and torque which is faster than the low speed and high torque of Figs. 3 and 4, and slower than the normal speed which would result from a direct connection between pump 1 and driven motor 9 or as obtained in Fig. 2, or as will now appear in Fig. 6.

Figure 6:
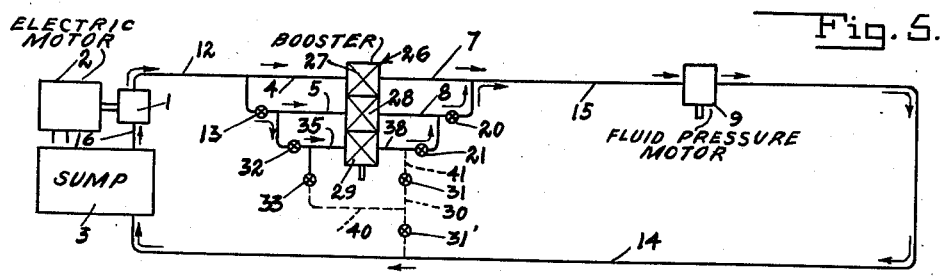
Fig. 6 is a schematic diagram of the same hydraulic system as shown in Fig. 4 with connections established for obtaining medium speed operations.

The hydraulic circuit shown in Fig. 6 corresponds generally to that shown in Fig. 2 and provides the normal or medium speed and torque which would be obtained if the booster 27 were by-passed. The circuit shown in Fig. 6 differs from that shown in Fig. 5 in that the outlet pipe 38 for motor unit 29 is now connected to delivery pipe 15 by way of valve 21, and communication between outlet pipe 38 and sump 3 is cut off by valve 31 which is closed as indicated by part of the line 30 being shown in broken lines. The circuit thus established is substantially the same as that shown in Fig. 2. In this case, however, the three booster units 27, 28 and 29 will be idling instead of one.

Figure 7:
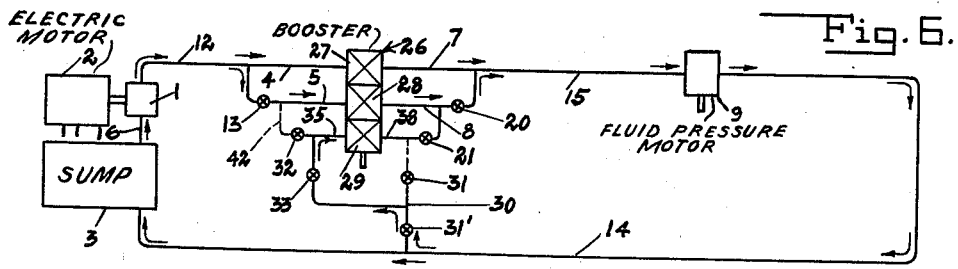
Fig. 7 is a schematic diagram of the same hydraulic system as shown in Fig. 4 with connections established for obtaining an operating speed, intermediate medium speed and high speed.

The hydraulic circuit shown in Fig. 7 may be established for the purpose of operating the driven motor 9 at a speed faster than the normal speed of the circuit shown in Figs. 2 and 6 and slower than the high speed operation obtained by an apparatus connected as shown in Fig. 1, for example, or in Fig. 8, to be described later. The torque output of driven motor 9 will of course be correspondingly lower. This hydraulic circuit differs from that shown in Fig. 6 in that valve 32 is closed, thereby cutting off the supply communication from pump 1 by way of supply conduit 12 and a branch of inlet pipe 5 as indicated by a broken line at 42, and valve 33 is open, thereby connecting discharge conduit 14 to inlet pipe 35 for unit 29, which will now perform the functions of a pump. Thus by these changes the supply of fluid under pressure to the motor unit 29 is changed from pump 1 to discharge pipe 14 leading from driven motor 9 so that unit 29 will now function as a pump driven by units 27 and 28 to add to the volume of fluid being supplied to delivery conduit 15. By comparing this hydraulic circuit with those in Figs. 1 and 2 it will be seen that motor unit 28 is connected in Fig. 7 for normal operation like motor unit 11 in Fig. 2, while motor unit 29 is connected for high speed operation similar to unit 11 in Fig. 1. Operation is thus provided at a speed intermediate normal speed and high speed.

Figure 8:
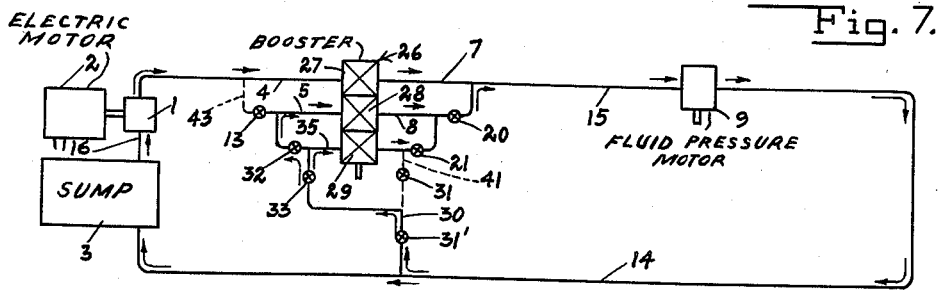
Fig. 8 is a schematic diagram of the same hydraulic system as shown in Fig. 4 with connections established for obtaining high speed operation.

Fig. 8 shows a hydraulic circuit in which the motor units 28, 29 of the booster 26 are both connected to function as pumps driven by unit 27 to increase the volume for high speed operation as does unit 11 in Fig. 1. This hydraulic circuit differs from that shown in Fig. 7 in that valve 13 is closed, thereby cutting off communication from supply conduit 12 to inlet pipes 5 and 35 as indicated by the broken line at 43, and valve 32 is open, thereby connecting sump 3 to inlet pipe 5 of unit 28 and connecting both units 28 and 29 to the low pressure line 14.

On the outlet side, valve 31 is closed, valve 31' is open, and valves 21 and 20 are both open. The entire output of pump 1 flows through booster unit 27, operating it as a motor, and it drives 28 and 29 which operate as pumps, taking liquid from pipe 14 and discharging it into pipe 15 along with the liquid discharged from unit 27. This provides the maximum rate of fluid flow to the driven motor 9, since the fluid from all three units flows into pipe 15, thereby providing maximum speed but minimum torque.

From the foregoing description it will be seen that by the practice of this invention I have provided means in the form of a hydraulic booster by which a flow of fluid under pressure having a constant rate and constant pressure may be converted into a flow having different characteristics of volume and pressure. For example, the booster may be connected with a constant flow of fluid pressure pump and a fluid pressure operated driven motor so as to increase the volume of flow and reduce the pressure of fluid delivered to the driven motor so that said motor will operate with increased speed and less torque than that normally obtained from the pump and motor. Conversely, the booster may be connected with the same supply pump and driven motor so as to decrease the volume of flow and increase the pressure of fluid delivered to the driven motor 9 so that the motor will operate with less speed and more torque. By comparing the various results obtained in the hydraulic circuit shown in Figs. 4 to 8 inclusive, it will be seen that the number of variations in speed and torque are limited only by the number of steps of variation in the connections of the booster. If the booster units are of constant displacement, the changes in volume and pressure rates will occur in definite ratios, the numerical values of which will depend on the relative sizes of the pump unit and motor units of the booster. It follows that if one or all of the units of the booster be of the variable volume type, a variable ratio can be obtained, with the limits of ratio variation being dependent upon the range of variations of volume possible in the booster pump and motor units.

I claim:

1. A hydraulic system having a high pressure side and a low pressure side and a motor-driven pump for maintaining a differential pressure between the two sides, a driven hydraulic motor through which fluid flows from the high pressure side to the low pressure side, a booster in the high pressure side having two mechanically coupled rotary hydraulic units selectively operable either as a motor or pump, one unit of the booster being continuously connected between the pump and the driven hydraulic motor, the other unit being selectively connected between the pump and the driven hydraulic motor through valves on its inlet and discharge sides, and valved connections from the inlet and discharge sides of the last-named unit to the low pressure side of the system, the valves in the connections being selectively operable.

2. A hydraulic system having a high pressure side and a low pressure side and a motor-driven pump for maintaining a differential pressure between the two sides, a driven motor operated by the flow of fluid through the system, a booster unit in the high pressure side of the system between the pump and the driven motor having a plurality of hydraulic mechanically connected rotary units each of which is interchangeably operable as a pump or a motor, pipe connections through which fluid from the motor-driven pump is connected through the first of said units to the driven motor, connections with selectively operable valves therein leading from the pump to each of the other units, connections with selectively operable valves for connecting the discharge of each of the other units with the driven motor, and valved connections between the inlet and outlet sides of the said other units and the low pressure side of the system, the valves in the last-named connections being selectively operable for opening and closing the respective connections.

3. A hydraulic power system comprising a motor-driven rotary pump, a booster having at least two mechanically connected rotary hydraulic units each of which are interchangeably operable as a pump or motor, a driven hydraulic motor, a line through which one unit of the booster is connected with the outlet of the motor-driven pump, a line through which the outlet of the same unit of the booster is connected with the driven hydraulic motor, a line having a valve which may be selectively opened and closed connecting a second unit of the booster with the output of the motor-driven pump, a line leading from the outlet of the second unit of the booster to the driven hydraulic motor, a valve in said last-named line which may be selectively opened and closed, a low-pressure fluid return system from the driven hydraulic motor to the inlet of the motor-driven pump including pipe connections and a reservoir, a connection between the inlet side of said second unit of the booster and the return system having a valve therein selectively operable to establish or cut off communication between the inlet side of said second unit and the fluid return system, a similar valved connection at the outlet of the said second unit of the booster and the return system, whereby said second unit of the booster may be selectively operated to receive fluid from the motor-driven pump and deliver it to the driven motor or deliver it to the fluid return system or receive fluid from the fluid return system and deliver it to the driven hydraulic motor.

4. A hydraulic power system as defined in claim 3 in which the booster also has a third unit also selectively operable as a pump or motor and mechanically connected with the first two units, the third said unit having valved connections in all respects similar to the second one of said units selectively operable in the same combinations as the second one whereby two units of the booster may operate as motors to drive the third, or two units of the booster may be driven by the third to operate as pumps, or whereby all three units may be idle in the line between the motor-driven pump and the driven hydraulic motor.

References Cited in the file of this patent
UNITED STATES PATENTS
2,550,405   Crosby _____ Apr. 24, 1951